United States Patent [19]
Jackson et al.

[11] 3,715,797
[45] Feb. 13, 1973

[54] METHOD FOR SOLDER REMOVAL

[75] Inventors: Thomas J. Jackson, Fremont; Dan A. Weltsch, Sunnyvale; Stephen J. Beattie, Redwood City, all of Calif.

[73] Assignee: Wik-It Electronics Corporation

[22] Filed: Oct. 23, 1970

[21] Appl. No.: 83,597

Related U.S. Application Data

[62] Division of Ser. No. 667,406, Sept. 13, 1967, abandoned.

[52] U.S. Cl. ....................29/426, 117/121.2, 228/19
[51] Int. Cl. ..............................................B23p 19/00
[58] Field of Search ......228/19, 20, 35; 29/426, 427, 29/489, 495; 431/325

[56] References Cited

UNITED STATES PATENTS

| | | | |
|---|---|---|---|
| 3,371,249 | 2/1968 | Prohofsky | 228/35 X |
| 3,627,191 | 12/1971 | Hood, Jr. | 228/19 |

*Primary Examiner*—J. Spencer Overholser
*Assistant Examiner*—R. J. Craig
*Attorney*—Mark Mohler et al.

[57] ABSTRACT

A rope-like member of braided heat conducting metallic wires coated with a second metal and a flux is applied to a solid solder joint. Heat applied to the rope-like member liquifies the solder which in turn is absorbed into the member thereby removing solder from the joint.

4 Claims, 3 Drawing Figures

PATENTED FEB 13 1973 3,715,797

INVENTORS
THOMAS J. JACKSON
DAN A. WELTSCH
STEPHEN J. BEATTIE by Ronald C. S. Lisman
Patent Agent

METHOD FOR SOLDER REMOVAL

CROSS REFERENCE TO RELATED APPLICATIONS

This application is a division of co-pending application Ser. No. 667,406 filed on Sept. 13, 1967, now abandoned and is assigned to the same assignee as said co-pending application.

BACKGROUND, FIELD OF INVENTION

This invention pertains to an apparatus and method for removing solder from soldered joints.

BACKGROUND, PRIOR ART

In the past, removal of solder from soldered joints has been very difficult to achieve. Some prior art methods have utilized the technique of liquifying the solder with a hot soldering iron, and then trying to knock or shake the solder from the joint before the solder solidifies again. This technique is not reliable, nor effective, and has been found to damage electrical components as the frame or base member upon which the joint and the electrical components are mounted are shaken.

Other prior art methods have utilized a syringe or other suction device for sucking up the liquid solder. Such syringes have been found to clog up readily with solder as it solidifies. Further, it has been found that sucking up a small pool of liquid solder as in for example, a small soldered joint on a printed circuit board has a tendancy to lift the thin film of printed circuit material from the epoxy substrate or board, thereby totally ruining the printed circuit board.

SUMMARY

One preferred embodiment of the present invention which overcomes the problems of the prior art is achieved by providing a strand or rope-like member of a plurality of tin-coated copper wires braided together and then coating the strand with a fluxing material. In this manner liquid solder will readily flow up the interstices between the individual tin-coated wires when a portion of the member is placed in contact with solid solder and heat is applied to the solid solder. Removal of the heat from the solder will then cause the captured liquid solder to solidify in the interstices. Thus the solder is rapidly and efficiently removed from its former location. This apparatus has an additional advantage of providing a heat sink to thereby preclude overheating of electrical components that may be located very close to the solder that is being heated and removed by the present invention.

It is therefor an object of the present invention to provide an improved solder removal apparatus and method.

The features of novelty that are considered characteristic of this invention are set forth with particularity in the appended claims. The organization and method of operation of the invention may best be understood from the following description when read in connection with the accompanying drawing.

DESCRIPTION OF A PREFERRED EMBODIMENT

Figures 1, 2:
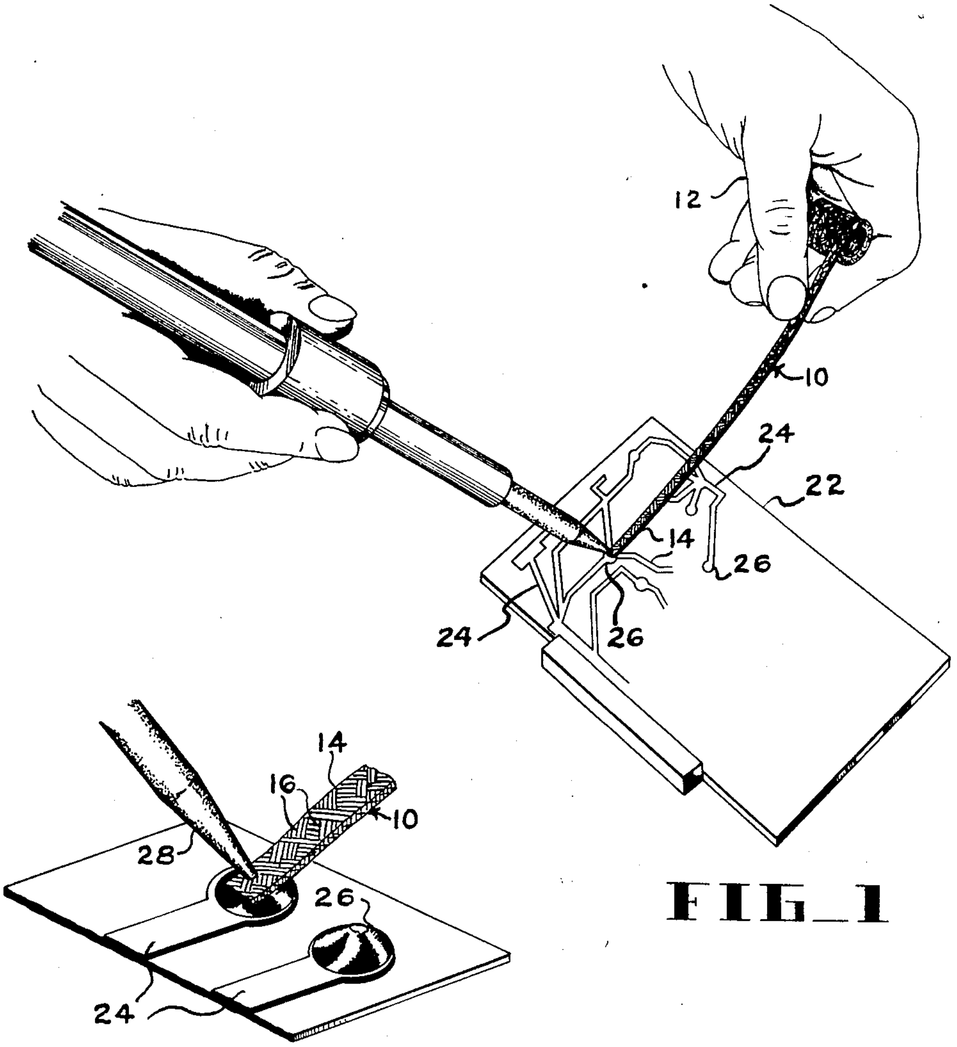
FIG. 1 is a perspective view showing the method of operation of the present invention.
FIG. 2 is an enlarged view of a portion of FIG. 2, showing the method of operation of the present invention.
Figure 3:
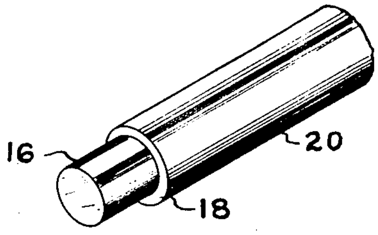
FIG. 3 is a partial cutaway view of one wire of the braided member of the present invention.

In FIG. 1, there is shown a strand or member 10 of braided or rope-like material, a portion of which is coiled up and held in the left hand 12 of an operator, and an uncoiled portion 14 which is in active use.

The member 10 is comprised of a plurality of inner efficient heat conductive metallic wires 16, such as for example, copper, each coated with a corrosion resistant material 18, such as for example, tin. The thus coated wires are then coated with any well known liquid or semisolid flux material 20 well known in the art to which the present invention pertains.

The plurality of coated wires are then bound together as by braiding so as to define narrow interstices between the individual wires.

It is to be noted that the flux material may be provided on the individual wires, before or after the binding together thereof, as desired.

There will now be described the method of operation of the present invention. In FIG. 1 and FIG. 2, there is shown a printed circuit board 22 having a plurality of electrical conducting paths 24. In addition, there is included on the circuit board a plurality of electrical joints each of which includes a mass of solid solder 26; the mass of solder is to be removed as when it is desired to change the electrical component (not shown) connected thereto. The electrical components, such as resistors, capacitors etc., are usually contained on the opposite side of the board and their leads extend through holes in the board and have been previously soldered to the paths 24 as shown.

A small portion of the braided material 14 is applied to the top of the mass of solid solder 26. A heated soldering iron tip 28 is then applied to the portion of the braided member that is in contact with the solder. Heat is thus transfered from the soldering iron tip to the braided member, and thence to the solder. The heat melts the solder. The thus liquified solder enters the interstices of the braided member by the action. Now the soldering iron tip is removed from he braided material, and the braided material is removed from the joint taking with it the solder.

The solder then quickly solidifies in the braided material. As further portions of the braided material are used the used portions may be snipped or cut off and thrown away.

In order to show the used portions more clearly, the tin coating may be dyed or otherwise colored such that the solder captured will cover-up the dye thereby showing, by contrast, the used portions of the braid-material While the principles of the invention have been made clear in the illustrative embodiment, there will be obvious to those skilled in the art, many modifications in structure, arrangements, proportions, the elements, materials, and components, used in the practice of the invention and otherwise, which are adapted for specific environments and operating requirements, without departing from these principles. The appended claims are, therefore, intended to cover and embrace any such modifications within the limits only of the true spirit and scope of the invention.

What is claimed is:

1. Method for removing solder from a solid soldered joint comprising:

a. contacting the solid solder at said joint with a wick of heat conducting metal wires coated with a flux;

b. applying heat to said solid solder for a time sufficient to liquify the same;

c. maintaining said contact between said wick and the liquified solder for a time sufficient to allow the liquefied solder to be drawn into said wick by capillary action; and d. removing said heat and said wick from said joint.

2. The method of claim 1 wherein:

e. said wires have an intermediate coating of a corrosion resistant material.

3. The method of claim 1 wherein:

e. said heat is applied to said wick and conducted thereby to the solder at said joint.

4. The method of claim 1 wherein:

e. said heat conducting metal wires are copper wires.

* * * * *